United States Patent [19]

Riddle et al.

[11] Patent Number: 4,605,921
[45] Date of Patent: Aug. 12, 1986

[54] DIGITAL WORD-FRAMING TECHNIQUE AND SYSTEM

[76] Inventors: Herbert S. Riddle, 2025 NW. Northrup, Suite 317, Portland, Oreg. 97209; Mark Bodio, 4025 S. 45th Pl., Phoenix, Ariz. 85040

[21] Appl. No.: 506,197

[22] Filed: Jun. 20, 1983

[51] Int. Cl.$^4$ ............................................. H03M 13/00
[52] U.S. Cl. ................................. 340/347 DD; 371/47
[58] Field of Search .................. 340/347 DD; 371/47, 371/70

[56] References Cited

U.S. PATENT DOCUMENTS

| | | | |
|---|---|---|---|
| 3,403,377 | 9/1968 | Connolly et al. | 371/47 |
| 3,449,717 | 6/1969 | Smith et al. | 371/70 |
| 4,316,285 | 2/1982 | Bobilin et al. | 371/47 |
| 4,389,636 | 6/1983 | Riddle, Jr. | 340/347 DD |
| 4,397,020 | 8/1983 | Howson | 371/47 |

Primary Examiner—Bernard Roskoski
Attorney, Agent, or Firm—Bromberg, Sunstein & McGregor

[57] ABSTRACT

A method is provided for decoding an encoded signal that includes a series of encoded digital data messages. Each message is encoded in such a way that each bit thereof is contained in the ordering of a complementary bit pair. Each encoded message is separated by a plurality of non-complementary bits. Decoding is provided by simultaneously analyzing a plurality of bit pairs of the encoded signal and producing an output when there are identified (i) a string of complementary bit pairs having a length in pairs equal to the number of bits in one of the messages and (ii) a plurality of non-complementary bits in at least one of the positions immediately preceding or immediately following the string.

17 Claims, 4 Drawing Figures

FIG. 3 (DECODER 30)

FIG. 4

DIGITAL WORD-FRAMING TECHNIQUE AND SYSTEM

DESCRIPTION

This application is a continuation in part of U.S. patent application Ser. No. 203,475, filed Nov. 3, 1980, and now issued as U.S. Pat. No. 4,389,636.

THEORY OF THE INVENTION

The present invention relates to digital encoding and decoding systems for detecting errors in digital data transfer systems.

The fundamental field of Information Theory has received extensive attention and analysis since Shannon's monumental theoretic derivations in the late 40's indicated that there existed methods for transmitting information with arbitrarily low error rates as long as his "Channel Capacity" was not exceeded. An incredible amount of effort has been justifiably expended over the intervening decades towards building hardware which could approach the theoretical limits proposed by Shannon. Although his work proved the existence of optimum methods, it provided no information whatsoever as to how these methods could be arrived at, and was in fact the solution to many as yet undiscovered and undefined problems. The mathematically-based field of Coding Theory developed from Shannon's fundamental theories, and copious volumes have been devoted to the subject. Suffice it to say that although his theorems gave no clue to the actual construction of these optimum coding schemes, the search for coding methods capable of even remotely approaching the theoretical Capacity has proved so difficult that a common theorem among coding theorists (to quote David Forney) is that "All codes are good, except those we can think of". In fact, most of the coding and decoding systems in use today are minor refinements of designs introduced over a decade ago (see "Coding and its Application in Space Communications," *IEEE SPECTRUM*, vol. 7, pgs. 47–58, June 1970, by G. David Forney, Jr., Codex Corp.).

U.S. Pat. No. 4,389,636 describes a unique non-binary encoding/decoding process for high-reliability data transfer. As is stated in the abstract, the technique is referred to as a quaternary rate—one-half error-erasure-transformation coding process. The quaternary, or 4-state, nature of the code results from the fact that the data is encoded and received as pairs of bits, or "dibits". It is a well known fact that any pair of bits can exist in only 4 possible states, or to be specific 00,01,10, and 11. In the aforementioned application, the data is enclosed as complementary-pairs and examined in the decoder for complementarity in a unique fashion utilizing a shift register and appropriate logic circuitry. Thus the error detection properties inherent to the Decoder enable the detection of, among other things, any single-bit error in the received encoded stream, since regardless of whether a particular bit-pair is 01 or 10, any single error can only force the pair to one of the other 2 possible states, namely 00 or 11. The decoder recognizes these states as being non-complementary, and detects that the data bit contained in the affected pair has been erased (hence the term "error-erasure-transformation" code). Only if the 2 bits in a pair are reversed by 2 adjacent-and-opposite errors in the pair can the information contained in the pair be misinterpreted by the receiver. The probability of such adjacent-pair inversions is usually extremely small, yet as is pointed out in the aforementioned Application only a *double* data bit-pair inversion in a word can cause a non-detectable word error (since the parity bit detects all odd numbers of decoded-bit errors). Such a non-detectable error could, of course, only result from a quadruple bit inversion due to 4 errors (or any integer multiple thereof, such as 8). However, not only must at least 4 errors occur in a single word, they must also occur in the *correct metrical orientation* as to be in 2 data-dibit positions. In addition, any 4 random noise hits must also be the correct set of 4 to exactly invert the 2 data-dibits over which they are superimposed, i.e. the correct set of the $2^4$ or 16 possible combinations of 4-bit sets of which only one will be the proper set of 4 to cause a double data-bit-pair inversion. If the noise hits occur independently at random times, the number arriving in any fixed time interval is likely to follow the well known Poisson process (see "Transmission Systems for Communications", Bell Laboratories Inc. revised Fourth Edition, December 1971, Chapter 7, "Common Types of Noise", pages 165–6). This process is characterized mathematically by $$p_{(n)} = \frac{(vT)^n (e^{-vT})}{n!} \tag{1}$$

(Note: only the script $p$ denotes Poisson probability; the std. capital P will be used to denote general probability) where $p_{(n)}$ is the Poisson probability that exactly n events occur in a time interval of duration T, and v is the average number of events occurring in unit time. Because of the N! expression in the denominator and the $(vT)^n$ term in the numerator, it can readily be seen that the Poisson probability (for vT's less than 1) rapidly diminishes as the number of events n increases. At $vT=1$, system noise is occurring so often that on the average 1 noise hit is occurring per word, so that system throughput would be seriously degraded. A more reasonable operation point would be at a vT of 0.1, i.e. where on the average one hit is occurring for each 10 words transferred. Most real systems would be likely to experience much smaller vT figures. For the sake of analysis we shall assume a very poor data-transfer environment such that $vT=0.1$, although this figure is to some degree controllable by the system operator, who could sometimes reduce vT by *increasing* the data transmission rate. We shall make the worst-case assumption that each noise hit is occurring so fast as to effect only one received encoded bit. Although noise hits are likely to smear over more than a single bit, especially at appreciable transfer rates, it has been shown previously in the aforementioned U.S. patent application that for any contiguous (i.e. smeared) strings of 1's (or 0's) received by the decoder the probability of a non-detectable error is zero. Thus to generate a non-zero error probability one must make the worst-case assumption that each noise event affects but a single received bit. A mathematical analysis of the Poisson function reveals that even with a poor system vT of 0.1, the probability of getting each additional event decreases at the rate of approximately 2 orders-of-magnitude per added event, i.e. for a system with a Poisson probability $p$ of getting 2 hits per word, the probability of getting exactly 4 hits per word falls to approximately $p/10,000$ (2 added events time ≈ 2-orders-reduction/added event=a reduction of $(100)^2=10,000$). Although classical coding theory dictates that the probability of error is much more easily reduced for long transmitted characters (i.e. hundreds or even thousands of bits in length), it can be demonstrated that this coding technique provides enormous reliability even when applied to very short characters such as the standard ASCII library commonly used in a aplha-numeric data transfer. Such characters are only 8 bits in length, consisting usually of 7 data bits and a single parity bit. These 8 bits after encoding will then comprise a 16-bit-long word. It can be demonstrated that even with an encoded word of only 16-bits in length, 4 errors can be inserted into this string in $$\binom{16}{4} = \frac{16!}{4!12!} =$$

1820 different combinations. Of these 1820 different ways in which 4 errors can be arranged in the 16-bit word, only a small number fall into the 8 data-dibit positions, namely $$\binom{8}{2} = \frac{8!}{2!6!} =$$

28 combinations. Thus only 28 of the 1820 possible combinations satisfy the geometric constraints of falling as pairs into any of the 8 data-dibit positions. Assuming again a worst-case situation where the noise hits cause random 1's and 0's to be inserted into the received word (since contiguous strings of either 1's or 0's are guaranteed detectable, then of the 16 possible random 4-bit patterns only 1 will satisfy the requirements of inverting the 4 corresponding bits so as to cause the 4 "hits" to be 4 errors. Thus the probability of a non-detectable word error equals the probability P of getting exactly 4 "events" in the character, times the number of ways in which the 4 events can land precisely in data-dibit positions, divided by the total number of ways in which the 4 events can be arranged into the 16-bit string, divided by sixteen (in order that the "events" be "errors"). Thus the probability of the double-data-bit-pair inversion is $$P_{(double\ data\ dibit\ inversion)} = P_{(n=4)} \times \frac{28}{1820} \times \frac{1}{16} = \frac{P_{(n=4)}}{1040} \quad (2)$$

for an 8-bit data word including parity bit (pre-encoding), where $P_{(n=4)}$ is the probability of getting exactly 4 events (i.e. noise "hits") in a single encoded-word-time, which is a variable dependent on operating environment, bit-packing-density on a magnetic medium, bit rate, and so forth. It is clearly evident that even for short words this coding technique provides an enormous increase in reliability over standard parity-bit-coded data, since parity fails for 25% of all random double noise hits (also 4,6, etc.). The relative improvement over parity is gained by:
(a) Requiring 2 additional errors for failure, which as has been shown reduces non-detectable word errors by approximately 4 orders of magnitude for Poisson-distributed noise hits.
(b) Requiring the 4 errors to fall precisely into data dibit positions, which further reduces the error probability by a factor of 1040 (for 8-bit words) due to the combinatorial geometric constraints inherent to the Code.
(c) Quantizing the errors-required-for-failure to integer multiples of a minimum-error figure.

Therefore, for a relatively "noisy" system transferring 8-bit ASCII characters (7 bits and parity bit) with noise hits occurring on the average of once each 10 words, the noise hits being Gaussian (random equiprobable 1/0 hits), and with the worst-case assumption of no contiguous strings of 1's (or 0's) in the noise (i.e. no bit smearing), then the relative improvement provided by using this coding technique can be seen to be nearly 7 orders of magnitude (worst-case). As is apparent, increasing the length of the words will only further reduce the probability of a non-detectable word error. Although Poisson-distributed noise has been used for the sake of analysis, many situations will of course involve other types of noise distributions and effects. Regardless of the exact model used, it can be seen that a tremendous improvement in reliability will nevertheless result.

Figure 1:
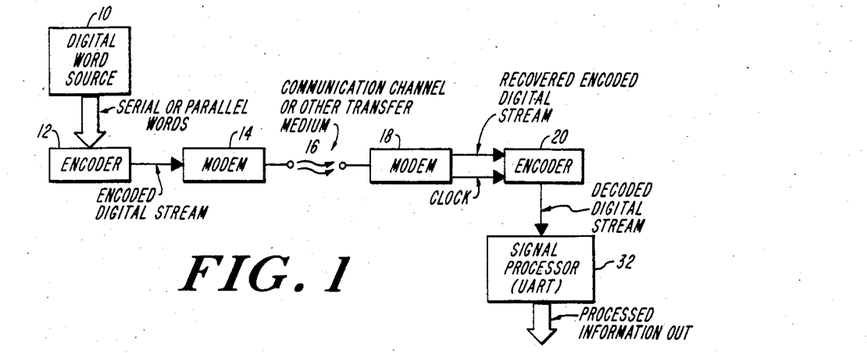
FIG. 1 is a block diagram of a system to which this invention is applicable, arranged in the format of a typical data transfer system, wherein the original digital information is first encoded into a serial digital stream, sent via a modem over a communication channel, received by another modem, and then sent to a digital decoder, which attempts to correctly decode the incoming stream and output only the correct original information, with digital word framing provided in prior art fashion by a Universal Asynchronous Receiver Transmitter (UART) 32.
Figure 2:
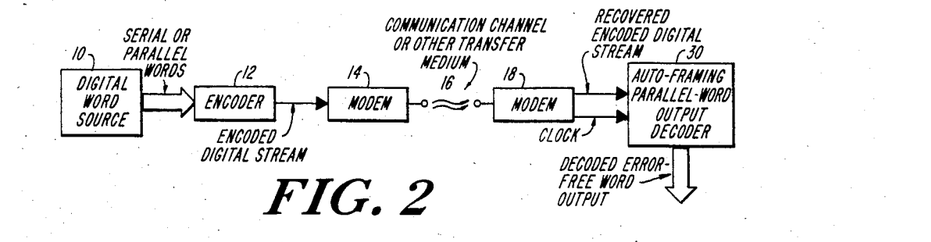
FIG. 2 is a block diagram of a system, similar to that of FIG. 1, wherein the decoder 20 and UART 32 are replaced by an auto-framing parallel word output decoder 30 in accordance with the present invention.

If the words to be transmitted are not unreasonably long, as in the above example, the shift register arrangement of the aforementioned U.S. patent application can be modified slightly so as to act as the complete digital processor which automatically frames each received word and outputs it in a parallel fashion as does the Signal Processor 32 shown in FIG. 1 of U.S. patent application 203,475. Concurrently, an improvement in word-location reliability can simultaneously be realized. This is because Signal Processor 32 is usually a commonly-available Universal Asynchronous Receiver Transmitter which often use a standard but sub-optimal algorithm for determining, from the continuous stream of incoming bits, the exact location of each character or word. Such UART's utilize the fact that standard transmitters usually insert a 0 "Start Bit" at the beginning of each data word, and insert one or two 1's as "stop bits" at the end of each word. Since the receiver knows the bit-length expected in its received words, it uses the Start Bit 0 to reset an internal counter to zero. When the counter reaches 8, for example, the receiver UART then expects the following bit to be a 1 Stop Bit. If such is the case, it then checks the received character for parity, using an internal parity calculator, and if the 8th (parity) bit received agrees with its own computation, it outputs the received word as being "correct". This simple algorithm or process for determining word-position in the received string suffers from a catastrophic failure mode which can occur when synchronization is lost by the UART. Such an occurrence can be frequent and occur whenever transmission is momentarily interrupted and part or parts of several words are loost, and could occur if but a single noise hit were to invert the 0 Start Bit. In such an instance the UART could make the erroneous assumption that the next 0 to be received is indeed the Start Bit 0, when in fact it is merely a data bit in a transmitted parity-bit-coded character. It will then unknowingly lose synchronization, incorrectly reset its internal counter, count 8 bits, look for a 1 Stop Bit, compare its internal parity calculation to the received 8th parity bit, and if parity checks (the probability is 50%) it will then fail catastrophically by outputting an erroneous random character with the assumption that it is correct.

This fatal loss of word synchronization can occur, as just demonstrated, by merely a momentary interruption in the received bit-string. This problem of word-misframing in digital receivers is well known, and numerous methods have been devised in attempts to lower the probability of such catastrophic (non-detectable) failures. As demonstrated previously, the UART could consider any potential "word" as valid if the apparent Stop Bit is a 1 and the Parity Bit calculation matches the received 8th bit. Since the probability of any random bit's meeting parity is 50%, as is the liklihood of a bit in the Stop Bit position being the correct 1, then in a loss-of-synchronization situation there can be a 25% chance of catastrophic failure on the first outputted "word". That a 25% failure rate due to sync slippage in a "high-reliability" system is untenable goes without saying. The multitude of techniques currently in use to minimize this problem is discussed in the IEEE Transactions On Communications, August 1980, No. 8, "Special Issue on Synchronization", which treats in more adequate detail the variety of potential problems involved in synchronization-acquisition, locking, tracking, loss, and re-acquistion.

Limited space must of necessity limit this discussion to that of a tutorial overview. To quote R. Scholtz (pg. 1205), "A good frame synchronization system will have the following attributes:

1. Rapid initial frame sync acquistion;
2. rapid detection of timing and frame sync recovery;
3. reliability of the lock indication;
4. simplicity of the clock synchronization algorithm;
5. minimal insertion of redundance in the data bit stream for synchronization purposes.

Certainly there exists a complicated tradeoff between measures of the "5 attributes".

SUMMARY OF THE INVENTION

Figure 3:
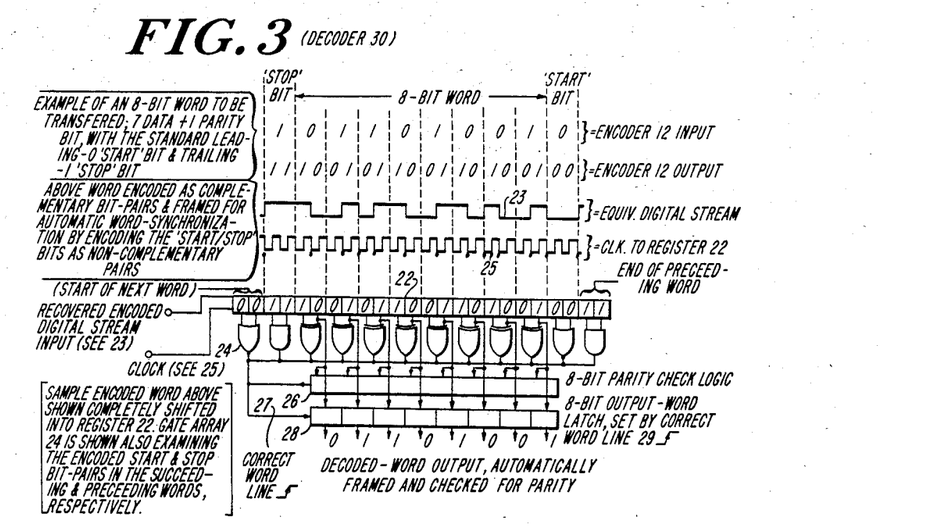
FIG. 3 is a diagram of an embodiment of the present invention in which the decoder 30 is constructed for use with 8-bit words, in which each word is framed with a leading 0 "start" bit and a trailing 1 "stop" bit prior to encoding; the embodiment is shown with a sample encloded word (with framing bits) shifted into register 22 thereof.

The word-framing process of this invention achieves all the above attributes by using other "non-data" (i.e. non-differential) states of the quaternary library, for example the 00 and 11 states. For example, as shown in FIG. 3, the Encoder 12 outputs the 8-bit word with the Data bits encoded as complementary-pairs, and with the standard 0 "Start" bit and 1 "Stop" bit encoded as non-complementary pairs, namely as 00 and 11 respectively. Decoder 30 uses this a-priori information of how the words are encoded to provide word-framing synchronization by looking for these unique non-differential pairs. Because words are often transferred at high speed serially, without inter-character gaps, the decoder can use this information to look, not only for the 00 at the start of a word and the 11 at the end, but also at the *end* of the preceding word and the *beginning* of the following word, to further increase the framing reliability.

DETAILED DESCRIPTION OF THE DRAWINGS

Although a decoder according to the present invention could also look at more than one word, such increased analysis would rarely be justified, as the misframing probability can easily be made to exceed the age of the universe by merely increasing the number of words examined by the decoder. This is because of the increased number of examined bits, which reduces the error probability essentially factorially. It can be seen that the decoder 30 of FIG. 3 examines both ends of a received word for a 0011 double-dibit in front and a 0011 double dibit at the rear. Misframing could occur if an adjacent pair of data dibits in one word were hit with the proper 2 errors, in order to force the two data dibits (01 or 10) to look like the front 0011 intentionally-non-differentially-coded framing dibits. Additionally, 2 more errors in the following word could, if properly placed, convert a differential-data-dibit adjacent pair into the non-differentially-encoded 0011 dibit pair which the decoder anticipates as the trailing double framing dibits in each word. Also, the 0011 non-differential inter-word framing dibits, which would of course lie between the above mentioned 4 errors, could be hit with the 2 appropriate errors so as to change them into what would appear to the decoder to be the anticipated differentially-encoded data dibits. Although these 6 errors, if placed in exactly the proper positions, could cause a misframing error, the probability of getting 6 appropriate errors in a 24-bit string (16+4+4) is extremely small. Six noise hits can be arranged into a 24-bit string in $\binom{24}{6}$ ways, which =

$$\frac{24!}{6!\ 18!} = \frac{6.204 \times 10^{23}}{(720)\ (6.402 \times 10^{15})} \tag{3}$$

for a total of 134,596 possible combinations. Of these combinations only one set of the 64 (=$2^6$) possible 6-noise-hit patterns will be the correct set to cause a misframing error in the decoder. Thus the probability of a word misframing error requiring 6 bit-errors is easily calculatable and is equal to $$P_{(n=6)} \times \frac{1}{134,596} \times \frac{1}{64} = P_{(n=6)}/8,614,144. \tag{4}$$

$$= P_{(n=6)} \times 1.161 \times 10^{-7}$$

As has been shown previously, each added required "event" decreases the Poisson probability by approximately 2 orders of magnitude at a system vT of about 0.1; thus just increasing n from 4 to 6 reduces the probability by an additional factor of nearly 10,000. Combined with this is the further reduction of nearly 10 million due to the geometrical constraints of the Code which require the "events" or noise hits to land in precisely the necessary positions to cause a non-detectable error. As demonstrated previously, the basic Code itself could fail at n=4, with the non-detectable-word-error probability in the example approximately 3 orders of magnitude below the Poisson probability of getting exactly 4 events in a word time (for short words of only 8 bits in length before encoding). Because the combinatorial geometric constraints in this misframing calculation furthur reduce the Poisson probability by nearly 10 million (=7 orders of magnitude), one can conclude that for this example the misframing likelihood is approximately 4 orders (going from n=4 to n=6) plus approximately another 4 orders (going from 1/1040 to 1/8,614,144) or about 8 orders of magnitude reduced below that of the actual 4-error-probability required to fail the Code itself, as has been shown. Thus the misframing error probability is apparently much lower than the basic code-failure probability, an optimum and desirable system characteristic. As long as the probability of a non-detectable-word-error due to misframing is lower than the probability of a non-detectable-word-error due to a decoding error, then the system designer can essentially disregard errors due to misframing. Obviously, simple techniques such as word-arrival timing, flag-to-flag dibit counting, multiple-word examination, and other checks for proper word (CWL line) timing could easily be implemented to further reduce misframing probability to essentially zero.

Referring again to FiG. 3, the sample encoded 8-bit word is shown completely shifted into serial decoder register 22. Note that the standard 0 Start Bit has been encoded as 00 (a 0 Data Bit is encoded of course as 10), and the standard 1 Stop Bit has been encoded as 11. At the front of the decoder is a NOR gate, whose output will be high only if both inputs are 0. To the right of the NOR gate is an AND gate which looks for the 11 non-differentially-encoded Stop Bit at the end of the preceding word. At the far left of Logic Array 24 is a similar decoding-gate arrangement, where the last gate in the register is a NOR gate which looks for the 00 dibit anticipated as the beginning of the following word, and next to that an AND gate which looks for the 11 non-differentially-encoded Stop dibit of the word in the decoder register. Between the 2 pairs of NOR-AND gates at the ends of the decoding array are the 8 EX-OR gates which examine the received encoded stream for complementarity in the data-dibit positions. All of the gates in the decoding logic array 24 are assumed to be open-collector devices so that the gates can be AND'ed by typing the outputs of the desired gates together, as shown. Decoder 30 is thus shown having all 12 gates AND'ed. Only when all the Data dibits in Register 22 are complementary and the NOR gates see 00 and the AND gates see 11 will the Correct Word Line 27 go high. When this CWL line 27 does go high, the decoder must therefore contain 8 complementary-encoded Data bits framed, as can readily be seen, by 4-non-complementary-encoded Framing dibits (the 0011 at each register end). This CWL line 27 is AND'ed with an Eight Bit Parity Check calculation circuit 26 whose output must also be a logical 1 to allow line 27 to go high (implying that the 8th, or parity, bit in the received word in Register 22 is the proper bit as calculated from the 7 Data bits in the register). An Eight Bit Output Word Latch 28 is controlled by the rising edge of this Correct Word Line 27. Thus when the CWL line 27 goes high (implying proper Framing, Data, and Parity calculations), the 7 decoded Data bits and the single Parity bit in decoder register 22 are latched and presented as an 8-bit-parallel Word to the outside world. This 8-bit Word will remain at the Latch 28 output until the CWL line again goes high, indicating that the decoder has received another properly-framed, error-free, and parity-checked word, whereupon the new 8-bit Word will instantaneously appear at the output of Latch 28. Decoder 30 is in actuality a high-speed digital signal processor which utilizes a novel decoding process to continuously analyze the encoded received bit-stream and output only decoded error-free words. Because the basic non-binary nature of the Code results in no complex computations being required in Decoder 30, it is apparent that such a decoder can run at virtually any speed, and that by merely using appropriately-fast digital-integrated-circuit technologies such a Decoding Computer could operate at received bit-rates in excess of 1 GHz (= $10^9$ Hz), or could easily be done in software with a simple computer program. Thus Decoder 30 provides Automatic Word Framing and Error Detection, and outputs only properly framed error-free words, essentially independent of the speed of the particular incoming data stream. Although the Decoder of FIG. 3 is shown in its basic form to avoid excess complexity, it will become apparent that modifications may be made to provide more sophisticated digital computing power in the decoder. As mentioned in the Abstract of U.S. patent application No. 203,475 by H. S. Riddle, Jr., the fundamental coding technique provides transformation of errors in the received encoded bit stream into erasures in the decoded data, an "erasure" in the information-theoretic sense being an unknown bit in a known position, and an "error" being a known-erroneous bit in an unknown position. For example, if a single error occurred in the 16-bit encoded (word) stream, the only possible result is that on of the encoded Data dibits would therefore become non-differential. As a result, the particular EX-OR gate examining that particular dibit would not go to a logical 1. Decoder 30 could then simply and easily detect 7 bits of Valid Data and 1 Erased Bit (actually an erased dibit). If the outputs of the 8 EX-OR's are inputted to a simple logic circuit which detects when only 1 of the 8 EX-OR gates is *not* high, then by using the Parity Bit in the received Word this detected Single Erasure can now be automatically corrected, since its position is known by the Decoder, and because any missing (i.e. erased) bit in any word of any length can be correctly recalculated and reinserted by using the information in the word's Parity Bit. For example, in the sample 8-bit word of FIG. 3, namely 01101001, Even Parity is assumed, hence the eighth (Parity) bit is a 0, since there are already an even number of 1's in the word, namely 4. If a data-transfer error erases, say, the 2nd 1, the Decoder 30 will know that an erasure has occurred in the 4th-bit position, in effect having received the word 0110?001. Since the Decoder has the a-priori information of whether Odd or Even Parity is used, the 0 in the Parity Bit position implies that this word had an *even number of 1's* prior to being transferred. Since the word has three 1's plus 1 erasure, then of course the erasure must have been a 1, otherwise the Parity Bit would have been 1. This "Single Erasure Correction" process can then, using Parity, output 01101001, automatically and simply correcting what it has detected as being a Single Erasure. For the sake of clarity such additional circuitry has been eliminated from FIG. 3. Suffice it to say that the error-erasure transformation characteristic of the basic Code allows any single erasure, even if it's the Parity Bit, to be automatically corrected. Since allowing any erasure to be present does bring in the possibility, albeit highly improbable, of incorrectly correcting an erasure if there has simultaneously also been a data-bit-pair inversion in the same word, in very noisy systems the ability to do Single Erasure Correction might not be desired. It can be demonstrated mathematically, however, that even for short 8-bit ASCII words, 100% of all Single Erasures due to Single Errors are of course guaranteed correctable, and that nearly 98% of all Single Erasures due to random 3-noise-hits (per word) would be properly and automatically corrected. Because of the geometrical (positional) constraints which the code forces upon noise-hits in order to cause non-detectable errors, only about 2% of Single Erasures due to random triple-noise-hits would be incorrectly "corrected," these being the apparent Single Erasures which simultaneously would also have a double-adjacent (data-dibit) inversion (i.e. 3 errors total, with 2 in a single data dibit).

The ability of this Code to do error-erasure transformation translates, not only into the capability to do Single Erasure Correction, but also into the capability to be used with other coding methods to vastly improve the error detection and error correction inherent to the other "inner" code. As explained in the previous Application, concatenation of this code with a powerful error-correcting inner code (such as a Reed-Solomon code) would improve the error-correction capability of the inner code and virtually eliminate the ever-present threat of Catastrophic Decoding Failure which plagues these sophisticated decoding algorithms. This coding/decoding process will be of importance to the field of Magnetic Recording which originated the use of the Manchester (Bi Phase) recording technique, and to other fields such as Fiber Optics and general electronic data transfer systems which have also adopted Manchester (Bi Phase) modulation because of its many attributes. Combination of the Riddle Code with an inner Hamming code (a popular single-error-correcting, double-error-detecting code which fails catastrophically for 3 errors) creates, as will be shown, a new multiple-error-correcting virtually-failure proof code. This can be accomplished at no increase in bandwidth in systems employing Manchester (Bi Phase), as the X2 increase in bandwidth which would be expected for the outer Riddle Code (a rate-one-half code) is exactly compensated for by the Bi Phase modulation. (A discussion of the Manchester (i.e. Bi-Phase) method, and its non-obvious limitations, as well as other methods, can be found in the article "Manchester Transfers Data with Integrity and Speed" by L. Sanders; *Electronic Design*, Mar. 19, 1981, pages 233 to 238.) Referring again to FIG. 3, it will be apparent that if only a single word is received, and not a string of words, the Decoder will not output the word, encoded as 11 ... 00, because it doesn't meet the framing criteria of having the 0011 double non-differential dibits at each end. This is easily remedied in the encoder, which was constructed to automatically start each new word sequence with 11, and end each sequence with 00. If the encoder has been idle and a single word arrives, the encoder automatically outputs 0011 . . . 0011, the added dibit at each end enabling the Decoder to output the single word. It is apparent that modifications may be made in the framing code without departing from the usefulness and novelty of the invention. Many other arrangements are of course possible. In situations where Single Erasure Correction is being performed by the Decoder, the Decoder is essentially allowed to overlook an erased dibit, which will of course be either 00 or 11. Since this decreases the framing reliability, a user could instead go to tribit, rather than dibit, framing. For example, each word could be encoded with 000 (not 00) as the Starting Tribit, and end with a 111 (not 11) Ending Tribit. The digital Decoder of FIG. 3 would then merely be extended by two bits at each end of the register and look for 000111 ... 000111. Although this greatly increases the framing reliability, it adds, as can be seen, 2 bits per word. This added redundancy could then be compensated for by sending the words framed as pairs of eight-bit words. Each double-word would then be encoded as 32 bits (8 bits/word × 2 words × 2 encoded bits/uncoded bit + 6 bits (the added 111 ... 000) = 38 bits). Using dibits, each 8-bit word (enclosed into 16 bits) is appended with 11 . . . 00, for a total of 20 bits, or 40 bits for 2 words. Thus the tribit-framing actually has less redundancy in this case, at the expense of sending a longer 16-bit character-pair. Regardless of whether dibit, tribit, (even 4-bit, etc.) framing is used, as the word length increases the amount of redundacy added by the framing bits themselves approaches zero. (One of the inventors has found that use of leading and trailing dibits can lead to a higher probability of catastrophic failure than would otherwise be expected with the invention if certain characters are transferred repetitively through the system in contiguous fashion. This higher risk of failure, due to a non-obvious character-dependent reduction in the minimum # of errors required to defeat the dibit-framing code, can be avoided by the use of framing with threee non-complementary bits; thus a tribit framing system will in many instances be a preferred embodiment.) It must be remembered that 8-bit ASCII characters, the accepted world standard for information exchange, are presently "framed" in a most inelegant manner with a 0 "Start Bit" and 1 "Stop Bit". This has been shown to fail catastrophically merely if the data stream is momentarily interrupted or if the 0 Start Bit is received in error. Thus the framing technique of the embodiment using non-differential-dibits to encode the already-present Start and Stop Bits actually adds *no redundancy* whatsoever to data-transfer or recording systems which have adopted the Bi-Phase modulation technique, the method which is rapidly becoming the world standard for information transfer. Originally invented for Magnetic Recording, Bi-Phase (often called "Manchester") places a "positive flux transition" in the center of each bit "cell" if the bit is a 1, and it puts a "negative flux transition" in the center of the bit "cell" if the bit is a 0. This is considered a useful method because it is "self-clocking"; long strings of 1's or 0's cannot saturate the medium, as data (flux) transitions are guaranteed to occur at the rate of at least one per bit. The data transitions which it guarantees are indeed useful for its "self-clocking" and "non-saturation" characteristics. However, this modulation method has never been treated as a mathematical code. What has been totally overlooked and undiscovered is the fact that this Bi-Phase method, in the process of "adding the clock in with the data" so that it's "self-clocking", is in actuality half of a fundamental code (the first-order Riddle code) which enables one to transfer a word *twice* by apparently sending it only *once*. Every Bi-Phase-modulated word is presently being decoded as though it were a single "data word combined with clock", when as has been demonstrated it is actually "data combined with its inverse". Knowledge that each "single" word is in reality *the same word simultaneously being sent twice* enables one to intelligently decode the *two* words that are actually present. Referring again to FIG. 3, one will note that the 8-bit word, which has been Riddle-encoded and shifted into Register 22, exists as 2 words, in the decoding register; the right-hand bits in each of the 8 dibits *are* the Original Word, namely 01101001; the left-hand bits in each of the 8 data-dibits are the exact Original Word, *inverted,* namely 10010110. The many orders of magnitude improvement in data-transfer reliability arise from this knowlege that the word has in fact been sent *twice*, not once. Hence the Digital Decoder 30 compares the 2 words that have been received to see if they are the same (actually, to see if the Inverted Word is the exact inverse of the Non-Inverted Word, a digital computation caried out by the Ex-Or logic gates in logic array 24, or in software if desired). The intractability of the "sending a word twice at once" concept to those well versed in the art becomes readily apparent when one consults relevant literature. To quote a Control Data Corporation article (see "New Techniques Squeeze More Data Onto Magnetic Tape", B. Javid, *Electronic Design News*, June 5, 1975, pages 63, 64);

"First to be introduced . . . was NRZ coding . . . But NRZ's disadvantages are numerous . . . Overcoming these problems brought about the widespread use of phase encoding techniques, notably bi-phase coding with One's and Zero's represented by flux transitions . . . Since at least one flux reversal occurs for each bit-cell, regardless of data content, self-clocking on a single track is inherent . . . However . . . because of bi-phase's flux change per bit-cell characteristic, more flux changes are needed to write the data . . . Newest entry in digital coding is the . . . group-coded recoding (GCR) technique . . . This method codes data such that there are not more than 2 consecutive Zero's . . . Also, no phase bits (noninformational flux reversals) need be added."

This reference to "noninformational flux reversals" (i.e. "phase bits" used to synchronize the clock and help find the center of each bit "cell") is typical of the mistaken assumptions surrounding Bi-Phase modulation which have cuased it to be sub-optimally decoded, and at grievous expense with regard to data integrity throughout the world. The referenced "noninformational flux reversals" are, as has been demonstrated, equally as informational as the data itself, being in fact the actual data.

A major remaining unsolved problem in coding occurs when a bit (or bits) is (are) either erroneously added to or deleted from the serial encoded data stream. To quote a Sperry Research Center paper (see "Higher Densities for Disk Memories", C. S. Chi, *IEEE Spectrum* March 1981, pages 39 to 43):

"Errors may be caused by dropouts" (missing bits) or "drop-ins" (extra bits) . . . The development of higher-density disks will require a reexamination of coding techniques . . . The ideal code should minimize the following quantities: (1.) The number of transitions per recorded bit . . . (2.) The dc component when the data has long strings of 1's or 0's. (3.) The time between transitions, to make reclocking easier . . . A major problem in designing disk memories, therefore, is selecting a digital recording code . . . "

The coding process of this invention completely solves the bit insertion/deletion problem. As can be seen from FIG. 3, if any bit is either added to or deleted from the incoming stream, Decoder 30 cannot make an error. This is because a change in the number of received bits will either separate or close the bit-distance between the framing dibits (or tribits, as the case may be). Since Decoder 30 must in the example shown have precisely 16 bits between the framing dibits, it is therefore impossible to have an erroneous word outputted as a result of bit insertion or deletion. It should be noted that the other characteristics desired of the "ideal code" are also met. Using 2 Zero's for the Start dibit and 2 One's for the Stop dibit preserves the code's precisely-zero dc component, regardless of the word transferred. This is because *all* encoded words, regardless of length and inclusive of framing dibits, have the exact same 50% code weight (i.e. the # of 1's always equals the # of 0'sa in any word). This is an extremely important but difficult characteristic to obtain with a powerful code, and is ideal for many modulators and demodulators (see Motorola Semiconductor Corp. article "Low-cost Transmitters and Receivers Serve Well in Fiber-Optic Links" by L. Foltzer, EDN, Oct. 20, 1980, pgs. 141–145, which states that" . . . special techniques must continuously control transmitted data's average value to realize a truly data-pattern-insensitive communication link . . . "). Another formidable but unsolved problem involves finding the "center" of the bit cells, since with Bi-Phase or Manchester whatever happens at the center of the bit cell determines whether that bit is a 1 or a 0 (i.e. a "positive flux transition" or a "negative flux transition", respectively). Numerous schemes have been devised to build electronic hardware which can synchronize itself to the incoming encoded data stream and attempt to locate the edges and/or therefore the "center" of each bit cell so that any transition there can be properly detected. To wuote a Philips Research Center article (see "Drop Your Costs But Not Your Bits With a Manchester Data Decoder", by J. Norton, *Electronic Design*, July 19, 1979, pages 110 to 116):

" . . . The ideal decoding circuit—inexpensive, yet operates with absolute minimum bit error rate-has not yet arrived, but the Manchester decoder in FIG. 1 comes close . . . One advantage of Manchester is that the same process both encodes and decodes data . . . Essentially, mid-bit transitions occur in the middle of each data-bit period . . . Modification, Manchester style, means combining a bit-rate clock with the data to give 2 bits of output data for a single input bit . . . logic zero data are represented by a zero during the first half of a bit period (or clock cycle) and by a one in the second half. Naturally, logic one data . . . are just the opposite. This method of defining Manchester data . . . is in accordance with Document 106-73 of the Inter-Range Instrumentation Group (IRIG) . . . To encode Manchester, data signals are combined with a clock in an exclusive-OR gate. This not only removes the dc component of the data, but now the data contains clock information that can be used at the receiving station for decoding purposes. To decode Manchester, note that a 2-input exclusive-Or gate produces the desired information when clock and Manchester data are combined. Interestingly, it's exactly the same scheme used to encode the data in the first place . . . For proper decoding, the incoming clock signal must be recovered in synchronism with the encoded data . . . Of course, you can't run a Manchester system with somewhat synchronous signals—you need perfect synchronism . . . When a noisy clock enters the system (it) requires more processing with a phase-locked-loop (PLL) to clean it up . . . "

This article accents the false assumptions surrounding Manchester (Bi-Phase) modulation in general, and, more specifically, the decoding. The statment that "the same process both encodes and decodes the data" is true in general, but as has been shown, it is not the optimal way by many orders of magnitude. Again, the failure of the scientific-community to realize that Bi-Phase modulation is part of a new fundamental non-binary mathematical code precludes intelligent decoding, and even intelligent description of the process. The encoded signal is not realized to be part of a new quaternary code, but is instead considered to be merely the data conveniently "mixed with clock" information to aid "decoding". The article continues with elaborate circuitry contrived in an attempt to "extract the clock"from the "mixture", when what should be extracted is in fact the *second word* that is being sent simultaneously in inverted form. Once one has discovered that Bi-Phase is half of a new non-binary quaternary error-erasure-transformation code, the problem of trying to "extract the clock in perfect synchronization" may be easily solved without any phase-locked-loops and without any of the data-stream synchronization preambles that are presently required in attempts to get the receiver demodulator precisely synchronized to the "clock" information in the encoded stream. It must be stressed here that the existance of this "clock" information is one primary feature of both Bi-Phase (Manchester) modulation *and* Riddle Coding, the difference being that the Riddle Decoder processes and decodes the "clock" information into the missing *second word* which Manchester decoders fail to recognize. The "Clock" line which drives Decoder 20 in FIG. 3 should have transitions which occur at or near the middle of each incoming bit to properly load the decoding register 22. The information from which this "clock" line must be derived is contained in the encoded serial digital stream input 23 in FIG. 3. For now it will be assumed that the Decoder knows the approximate expected incoming-bit-rate of the encoded data (although this rate could of course be easily determined by merely averaging the narrowest incoming pulses, which equal 1 bit-time). With the a-priori knowledge of the optimal decoding process and the approximate incoming bit rate, a remarkably effective process for generating the required clock pulses 25 may be realized which requires no code synchronization preambles or phase-locked-loops. This may be accomplished with nothing more than a simple oscillator and a resettable digital counter. In a preferred embodiment, the clock generator constructed to load Decoder register 22 consisted of an oscillator free-running at a multiple of the anticipated bit race, said oscillator driving a standard digital counter IC which was set to divide the oscillator frequency by a variety of preselectable binarily-weighted values. The prototype used an oscillator which was free-running at 16 times the bit rate, the oscillator output in turn driving a commonly-available divide-by-16 digital counter. Because the Shift Register 22 that was used shifted each bit on the rising edge of the clock line 25, what is therefore required is a clock signal which goes from a logical 0 to a logical 1 at the anticipated center of each incoming bit. The novel solution to the generation of this waveform (25 in FIG. 3) is to *reset to zero* the continuously-running divide-by-X counter at *each transition* of the incoming encoded bit stream. As evident in FIG. 3, the resulting Clock Waveform 25 has the required rising (clocking) edge at the center of each incoming bit, and is *continuously resynchronized* at each data transition of input waveform 23 (denoted as dots on waveform 25 in FIG. 3), wherein the counter is reset to Zero at each "dot". It can be seen that the number of pulses output by the digital counter cannot exceed 3 in normal operation, and is occassionally only a single pulse (prior to being reset) whenever identical (before decoding) data bits are adjacent. Because the circuitry required to generate this clock signal 25 is commonly available, and because this clock-generation technique could be readily implemented by anyone versed in the art, it was deemed unnecessary to complicate the figures with the actual circuitry, since the resulting desired waveform and reset points have been clearly indicated. It will be apparent that this very simple technique for synthesizing the clock signal 25 has a variety of important attributes lacking in virtually all decoders. Because the clock is continuously resynchronized every 1 to 3 bit-times (1 to 4 of course using tribit framing), high stability of the receiver oscillator's frequency is not required since even a several percent "error" will have virtually no effect on the sync accuracy and each incoming bit will be accurately clocked into the register. Also evident is the total absence of any phase-locked-loops or other complicated circuitry which is presently used in attempts to locate the "center" of each Bi-Phase "cell". Because of the unusual simplicity and efficacy of this clock-generation technique, no "preambles" or continuous strings of alternating 1's and 0's are required at the start of each received data stream to synchronize the receiver, which further accentuates the reduced redundancy of this new coding technique to below that of Bi-Phase (Manchester). This process to generate clock signal 25 essentially invalidates the aforementioned Philips Research Center statements that" . . . for proper decoding, the incoming clock signal must be recovered in syncronism with the encoded data . . . ", that" . . . perfect synchronism . . . "is required, and that when a" . . . noisy clock enters the system (it) requires more processing with a phase-locked loop . . . ". Another major advantage of the clock generating process of this invention is that it can allow a receiver (or receivers) to "listen" only to a transmitter which is sending encoded data at a rate close enough to that of the receiver's synthesized clock 25 to be accurately shifted into Decoding Register 22. In like fashion, the Decoder's frequency may be arbitrarily changed in order to enable it to listen to a *different* transmitter (or to many different transmitters in sequence). Likewise, a transmitter's encoding frequency may be chosen so that it can be received only by those decoders that are receiving near its transmitting rate. Thus either one or more transmitters can simultaneously operate and be selectively received by one or more receivers by merely coordinating the frequencies of those receivers and transmitters which are intended to communicate with each other. Further frequency selectivity of such a frequency-multiplexed multi-point communication system can be obtained by modifying slightly the aforementioned clock-synthesizing process which generates clock signal 25. For example, closer frequency allocations of multiple transmitters and/or receivers could be achieved by only, say, allowing the decoder's counter to be reset on every 2nd or 3rd (or 4th, etc.) incoming data transition. As the interval between decoder clock resynchronizations increases, the sensitivity of each receiver to the incoming bit rate is increased. It has already been shown that the insertion (or deletion) of even a single bit in a word causes the Decoder to recognize the word as being invalid. It will become evident from FIG. 3 that any decoder can intentionally be made to *ignore* incoming serial data by merely altering either the incoming bit rate or the receiver's synthesized clock sufficiently to add or subtract a bit from the encoded stream shifted into Decoding Register 22 by clock signal 25. This frequency-selectivity capability in inherent to this coding technique and can of course be used to great advantage in the fields of cryptography, covert communication, optical data links, and general communication systems where it is desirable to have one or more digital encoders capable of transmitting only to selected digital receiver(s). More sophisticated systems could send us information the next frequency to be transmitted (or received), wherein the designated sender or listener could then change its frequency to the new value and continue communicating at a different frequency. Suffice it to say that the many possible arrangements are too numerous to list, and that each must be tailored to the particular requirements of the system involved.

The foregoing discussions have mentioned the powerful and virtually failure-proof new codes that can be generated by combining this Quaternary Rate-One-Half Error-Erasure-Transformation Code with other codes, such as Reed-Solomon, Hamming, and many others, as are well known in the art. As is apparent, this new Code (which for reasons of space shall be referred to as the Riddle Code), can also be combined with itself; i.e. a Riddle-encoded bit-stream can be input into another Riddle encoder to produce what will be referred to as a "second-order" Riddle Code. Such a code would be "heximary" in that each bit would be represented by 4 bits rather than 2, and could therefore exist in 16 possible states rather than 4. This second-order Riddle Code, which shall be denoted as an $R_2$ code, could then have a 1 data bit represented as 1001 and a 0 data bit as 0110 (the "$R_1$" code is 01 and 10 respectively). The $R_2$ framing dibits could then become 1010 and 0101 instead of 00 and 11. As can be concluded from the previous analysis, this $R_2$ code would actually be equivalent to sending a word 4 times "at once", in the same manner that the $R_1$ code effectively sends a word twice at once. The Decoder for this $R_2$ code would therefore have a Register 22 twice the length of that shown in FIG. 3, and of course the Gate Array 24 would be appropriately modified to examine each data "quad" for the appropriate bit pattern of "2 middle bits the same, the 2 outer bits the same but inverted from the middle bits", again a trivial function to perform either in hardware or software. Rarely would any system require the enhanced reliability of an $R_2$ code; 8 errors must now be positioned geometrically perfectly, and in the right pattern, to cause a non-detectable word error (an "NDWE") in the decoder. Again assuming a short ASCII word (7 bits+1 parity bit), the encoded word would be 32 bits long (a rate-one-quarter code). Since precisely 8 errors (or an integer multiple thereof, such as 16, 24, etc.) would now be required for a non-detectable error, and because 8 errors can be inserted into a 32-bit string in $$\binom{32}{8} = \frac{32!}{8!24!} = 10{,}518{,}300$$

ways (of which only 1 in $2^8 = 256$ random 8-noise-hit events will be the correct pattern required to completely invert two $R_2$-coded data bits and thus fail parity detection), the probability of error is now $$P_{(n=8)} \times \frac{\binom{8}{2}}{\binom{32}{8}} \times \frac{1}{2^8} = P_{(n=8)} \times \frac{28}{10{,}518{,}300} \times \frac{1}{256} = \quad (5)$$

$$P_{(n=8)} \times (1.04 \times 10^{-8}).$$

From the previous calculation for the $R_1$ code, it was seen that the probability of a non-detectable word-error was $$P_{NDWE} = P_{(n=4)}/1040.$$
($R_1$ code)

Figure 4:
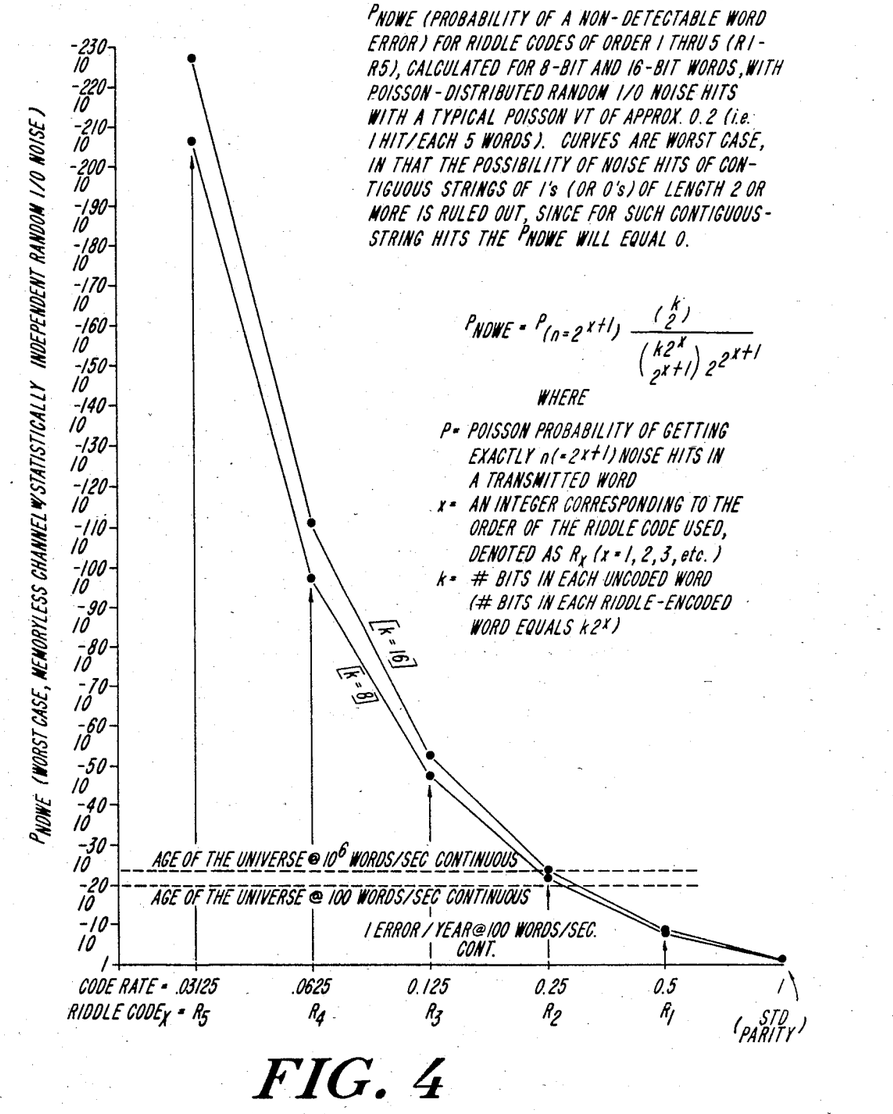
FIG. 4 presents a graph of the worst-case probability of non-detectable word error (an "NDWE") for various systems in accordance with the present invention.

Again, assuming a Poisson-distribution for the sake of comparison, each additional required noise "event" at a vT of 0.1 reduce the failure probability by about 2 orders of magnitude. Thus the $R_2$ code is even better than the $R_1$ code by approximately 13 orders of magnitude (4 added "events" times $\approx 2$ orders/event + $\approx 5$ orders due to the geometric constraints changing from 1/1040 to $\approx 1/10{,}000{,}000$). As is evident, making the words longer for either code rapidly further reduces the probability of a non-detectable word error. FIG. 4 is a graph of the probability of a non-detectable word error ($P_{NDWE}$) for Riddle Codes of order 1 thru 5. It would appear that going beyond an $R_2$ code (to an $R_3$ or $R_4$ code) would be unwarranted in most systems, since at a transmission rate of 10,000 words/second continuous, and with a very noisy channel having a Poisson vT of about 0.2 (i.e. 1 noise hit on the average for each 5 words), the time for a non-detectable error to occur with just an $R_2$ code exceeds the estimated age of the universe for both 8 and 16-bit data words. The figures for the higher-order Riddle Codes are presented more as a mathematical demonstration than an exercise in reality (the $P_{NDWE}$ for a 16-bit word $R_5$-encoded is $10^{-227}$, a figure so absurdly small as to be eminently demonstrative of the advantage of having an increasing factorial term in the denominator). It should be mentioned, however, that these curves are *worst case;* any bit-smearing is ruled out since it would automatically make the $P_{NDWE}=0$, as has been shown. The general expression for the $P_{NDWE}$ is therefore (see FIG. 4);

$$P_{NDWE} = P_{(n=2x+1)} \frac{\binom{k}{2}}{\binom{k2^x}{2^{x+1}}_2} 2^{x+1} \quad (6)$$
(for any $R_x$ code)

Where:
P = The probability of getting exactly n ($=2^{x+1}$) random noise hits in a transmitted word
x = An integer corresponding to the order of the Riddle Code used (x=1, 2, etc.), denoted as $R_x$
k = # of bits in each uncoded data word (with parity bit)
The probability of getting a non-detectable word error can be easily calculated for any order Riddle Code and any mathematically—definable noisy channel from knowledge of the word length and bit-error-rate (BER) of the data-transfer medium involved. For the sake of comparative analysis, what would be considered a "virtually unusable" channel with a ½% BER will be assumed to demonstrate the power of a first-order Riddle Code (any channel with a BER of even $10^{-4}$ or $10^{-5}$ would be considered marginal for even digitized-voice communication, and totally unusable for "reliable" data transfer). Assuming again standard 8-bit ASCII characters (7 bits + 1 parity bit) plus the standard 0 (Start) and 1 (Stop) bits, each word will be 10 bits long. Each word Riddle-encoded will then be 20 bits long, inclusive of the specially-encoded framing dibits. The BER of ½% (equivalent to a bit-hit-rate BHR of 1% for random noise, since ½ of the random hits will produce errors) implies that a noise hit will be occurring for each 100 bits, on the average, or that therefore one in every five words will be "hit". Referring again to Equation 1, the Poisson-probability of getting exactly 4 "hits" (required to fail the $R_1$ code), with a vT of 0.2 (i.e. 1 hit per each 5 words), is:

$$p_{n=4} \atop vT = .2 \quad = \frac{(.2)^4}{4! \, e^{.2}} = \frac{1.6 \times 10^{-3}}{24(1.22)} = 5.46 \times 10^{-5} \quad (7)$$

Using the general equation (6) for the $P_{NDWE}$ for any $x^{th}$-order Riddle code, the $P_{NDWE}$ for this example can be calculated to be:

$$P_{NDWE} \atop (R_1 \text{ code}) \quad \leq p_{n=4} \atop vT = .2 \quad \times \frac{\binom{8}{2}}{\binom{16}{4} 2^4} = \quad (8)$$

$$\frac{5.46 \times 10^{-5}}{1.04 \times 10^3} = 5.3 \times 10^{-8}$$

This implies that a single non-detectable word error will occur every $1/5.3 \times 10^{-8}$, i.e., about once in every 18 million words, a very respectable word-error rate for a ½% BER channel. If the information were not Riddle encoded/decoded (i.e. standard 8-bit ASCII) each word would be 10 bits long and the corresponding Poisson vT would be 0.1. As is well known, with standard parity-bit-check coding any even number of errors will result in a NDWE (i.e. 2, 4, 6, etc.). The infinite series need not be totalled since the $P_{n=2}$ term nearly always contributes the majority of the error probability. Accordingly, the Poisson probability of getting 2 hits/word now equals:

$$p_{n=2} \atop vT = 0.1 \quad = \frac{(0.1)^2}{2! \, e^{.1}} = \frac{.01}{2(1.11)} = 4.5 \times 10^{-3} \quad (9)$$

Since standard parity coding fails 25% of the time that 2 random bits are inserted into a word (assuming that the word has *not* been misframed), the corresponding:

$$P_{NDWE} \atop (\text{Std. Parity}) \quad > p_{n=2} \atop vT = .1 \quad \times \tfrac{1}{4} = \frac{4.5 \times 10^{-3}}{4} \approx 1 \times 10^{-3} \quad (10)$$

Thus the same ½% BER channel transferring standard parity-bit-coded ASCII characters, with the same noise distribution, will apparently experience a non-detectable word error about once each thousand words. This is a substantial loss in reliability compared to the single error in every 18 million words which could be achieved by using a first-order Riddle code on the same data. The above ASCII $P_{NDWE}$ of $10^{-3}$ would of course be impossible to attain in a real system, since any momentary interruption in the data stream or inversion of the 0 Start bit would likely cause a burst of word errors due to misframing as the decoder attempted to find the correct 0 Start bit (i.e. the contribution of misframing to the $P_{NDWE}$ is *not* included in the $10^{-3}$ ASCII figure; as shown previously, the misframing probability with Riddle coding can be so far below the $P_{NDWE}$ due to the first n=4 term as to be negligible, and can therefore be considered to be included in all $P_{NDWE}$ calculations for any $R_x$ code). For comparison, repeating the above calculations of $P_{NDWE}$ for the $R_1$ code with a 0.1% BHR channel results in a $P_{NDWE}$ of $6.28 \times 10^{-12}$, equivalent to an error every 160 billion words; the ASCII parity-bit-coded equivalent result indicates at best an error about every 80,000 words (if the disastrous results of misframing are again overlooked).

Obviously, the assumption of Poisson-distributed noise which is used in these calculations is arbitrary. It is used here primarily for the sake of calculation and demonstration, since it is an often-realistic and mathematically-definable noisy channel. Naturally there are a multitude of noisy/fading/burst-effected/Gaussian/-Rician/non-Gaussian/time-variant Poisson/etc. models for the many noisy channels that are found in the real world. The only two factors which seem common to all mathetically-based channel models are that virtually no model is readily accepted as being realistic by anyone (except the Space Channel), and the models which are accepted are generally accepted by persons who generated the models (and "their friends", to quote E. Berlekamp). The purpose of the foregoing calculations is solely to demonstrate that:

1. the likelihood of getting precisely 4 errors in any word, regardless of the channel, is usually much less than the probability of getting only 2 errors
2. a code which has geometrical constraints inherent to it, regarding *where* errors must be placed for code failure, is vastly more powerful than a non-geometrically-constrained code
3. multiple transmission of a word, if properly performed, can more than square the probability of a non-detectable error
4. a geometrically-constrained coding process can force the error-probability down nearly *factorially* with the length of the transmitted word (8!=40,320, whereas 64!=$1.27 \times 10^{89}$, a number which exceeds the number of elementary particles in the universe).

Any general analysis of $P_{NDWE}$, to be entirely correct, must take into account all the terms in an infinite series of probabilities. As mentioned above, the exact theorectical result for the ASCII code would require summing the $P_{NDWE}$'s for 2,4,6,8,10... errors. In like fashion, the exact $P_{NDWE}$ for any $R_x$ code would involve summing the $P_{NDWE}$'s for $2^{x+1}$ (times 1,2,3, ...) errors. Usually only the first one or two terms are the dominant contributors, although in very noisy systems (i.e. a 50% BHR) it can become necessary to sum several terms to get within 1% of the final value, as will be demonstrated shortly. Knowing the number of *errors* required to fail a code can be combined with whatever channel model is used for generating noise hits to derive the general expression for error probability. If the noise hits are assumed to be random 1-or-0 hits, the probability of any number of *hits* producing a certain number of *errors* in a word can be found from:

$$P_{H/E} = \frac{\binom{H}{E}}{2^H}\bigg|_{H \geq E} = \frac{E! \frac{H!}{(H-E)!}}{2^H} \quad (11)$$

where $P_{H/E}$=the probability of H hits producing *exactly* E errors (H must of course be >E or $P_{H/E}=0$) and $\binom{H}{D}=1$ As an example using the above-defined notation, the probability of 5 random hits producing 5 errors would be denoted as "$P_{5/5}$" and would equal $\binom{5}{5}/2^5=1/32$. Likewise, the probability of 5 hits producing exactly 4 errors is $P_{5/4}=\binom{5}{4}/2^5=5/32$. The complete probability set for 5 hits producing 5,4,3,2,1 and 0 *errors* is therefore:

$$P_{5/5} = \frac{\binom{5}{5}}{2^5} = \frac{1}{32} \quad P_{5/2} = \frac{\binom{5}{2}}{2^5} = \frac{10}{32} \quad (12)$$

$$P_{5/4} = \frac{\binom{5}{4}}{2^5} = \frac{5}{32} \quad P_{5/1} = \frac{\binom{5}{1}}{2^5} = \frac{5}{32}$$

$$P_{5/3} = \frac{\binom{5}{3}}{2^5} = \frac{10}{32} \quad P_{5/0} = \frac{\binom{5}{0}}{2^5} = \frac{1}{32}$$

Obviously, the sum must be 1 as the 6-number set includes all the possible error combinations which exactly 5 hits can cause, including zero errors. Note that any number of random hits is most likely to produce *half* as many errors, and that for any odd number of hits the probability of producing errors is the *same* for the 2 "median" error values (i.e. for H=5, $P_{5/3}=P_{5/2}$). The easily-determined error probabilities (the BER) due to H hits (the BHR) can be combined with the channel-noise-hit model and the geometric and required-error contstraints to derive the general solution to $P_{NDWE}$ for any $x^{th}$-order Riddle Code. The script notation $p_{H/E}$ will be introduced to denote the probability that H Poisson—distributed noise hits produce exactly E errors i.e. $p_{7/4}$=the Poisson probability of getting precisely 7 hits and having those 7 hits produce exactly 4 errors. The $R_1$ code has been shown to possibly fail first with 4 *required errors*. Since 6 errors could possibly, if properly placed, cause a triple-dibit inversion, the resulting 3 *decoded* bit-errors would be caught on the standard parity check, which catches all odd numbers of errors. Thus the $R_1$ code requires 8 properly-placed errors for the next-higher failure mode (16 random hits would be most likely to produce 8 errors, whereas 8 hits would be most likely to produce 4 errors, etc., since BER=BHR/2 for random noise).

For example, for 8-bit words encoded with a first-order Riddle Code, the exact expression for the $P_{NDWE}$ is a set of 4 infinite series, which in the aforementioned notation is:

$$P_{NDWE} = \sum_{n=4}^{\infty} P_{n/4} \frac{\binom{8}{2}}{\binom{16}{4}} + \sum_{n=8}^{\infty} P_{n/8} \frac{\binom{8}{4}}{\binom{16}{8}} + \quad (13)$$
(R_1 code,
8-bit words)
incl. parity $$\sum_{n=12}^{\infty} P_{n/12} \frac{\binom{8}{6}}{\binom{16}{12}} + \sum_{n=16}^{\infty} P_{n/16} \frac{\binom{8}{8}}{\binom{16}{16}}$$

Because the $2^{nd}$, $3^{rd}$, and $4^{th}$ series contribute little to the total, and for reasons of space, only the first (n=4) series will be examined in detail.

$$\sum_{n=4}^{\infty} P_{n/4} \frac{\binom{8}{2}}{\binom{16}{4}} = \frac{\binom{8}{2}}{\binom{16}{4}} [P_{4/4} + P_{5/4} + P_{6/4} + P_{7/4} + P_{8/4} + \quad (14)$$

$$P_{9/4} + \ldots]$$

$$= \frac{\binom{8}{2}}{\binom{16}{4}} \left[ P_4 \frac{\binom{4}{4}}{2^4} + P_5 \frac{\binom{5}{4}}{2^5} + \right. \quad (15)$$

$$\left. P_6 \frac{\binom{6}{4}}{2^6} + P_7 \frac{\binom{7}{4}}{2^7} + P_8 \frac{\binom{8}{4}}{2^8} + P_9 \frac{\binom{9}{4}}{2^9} + \cdots \right]$$

$$= \frac{\binom{8}{2}}{\binom{16}{4}} \left[ P_4 \left(\frac{1}{16}\right) + P_5 \left(\frac{5}{32}\right) + \right. \quad (16)$$

$$P_6 \left(\frac{15}{64}\right) + P_7 \left(\frac{35}{128}\right) + P_8 \left(\frac{70}{256}\right) +$$

$$\left. P_9 \left(\frac{126}{512}\right) + \cdots \right]$$

$$\therefore P_{NDWE} = \frac{P_4}{1040} + \frac{P_5}{416} + \frac{P_6}{277.33} + \frac{P_7}{237.71} + \quad (17)$$
(R_1 code,
8-bit words)
incl. parity $$\frac{P_8}{237.71} + \frac{P_9}{264.12} + \cdots$$

In Equation 14, the $P_{4/4}$ term is the probability of getting 4 hits and having those 4 random hits be errors. In Equations 15 thru 17, the $P_4$, $P_5$ etc. terms are just the probabilities of getting that many hits. Because at an assumed system channel vT of 0.1 each additional "hit" or event occurs with about 2 orders of magnitude reduced probability (i.e. words with 4 hits are about 100 times more likely to occur than words with 5 hits, etc.), then for all but the noisiest Poisson-distributed-noise channel the $P_{NDWE}$ can be calculated to within a percent or so using just the $P_4/1040$ term in Equation 17 and neglecting the following terms. This has been done in FIG. 4, which gives the general $P_{NDWE}$ expression for any $x^{th}$- order Riddle Code for data words of any length k. Although equation 17 has been derived for the $R_1$ code, the reader can easily duplicate the series if desired for higher-order codes by using the expression $$P_{NDWE} \text{ (any } R_x \text{ code for } k\text{-bit words)} \leq \frac{\binom{k}{2}}{\binom{k2^x}{2^x}} \sum_{n=2^x+1}^{\infty} P_{n/2x+1} + \quad (18)$$

[additional series per eqn. 13]

For example, a second-order (rate $\frac{1}{4}$) Riddle Code with 32-bit (uncoded) words yields (neglecting the higher-order infinite series):

$$P_{NDWE} \text{ } (x=2, k=32) \text{ [}R_2 \text{ code]} \leq \frac{\binom{32}{2}}{\binom{128}{8}} \sum_{n=8,9,\ldots}^{\infty} = \quad (19)$$

$$\frac{\frac{32!}{2!\,30!}}{\frac{128!}{8!\,120!}} \sum_{n=8,9\ldots}^{\infty} P_{n/8}$$

$$= \frac{496}{1.43 \times 10^{12}} \sum_{n=8,9}^{\infty} P_{n/8} = 3.47 \times 10^{-10} [P_{8/8} + \quad (20)$$

$$P_{9/8} + P_{10/8} + \ldots ]$$

$$= 3.47 \times 10^{-10} \left[ P_8 \frac{\binom{8}{8}}{2^8} + P_9 \frac{\binom{9}{8}}{2^9} + \quad (21)$$

$$P_{10} \frac{\binom{10}{8}}{2^{10}} + \ldots \right]$$

$$= 3.47 \times 10^{-10} \left[ P_8 \left(\frac{1}{256}\right) + P_9 \left(\frac{9}{512}\right) + \quad (22)$$

$$P_{10} \left(\frac{45}{1024}\right) + \ldots \right]$$

If the probability of getting 9 or more noise hits is a small fraction of the probability of getting 8 hits in a single word time, then the $P_8$ term is the dominant contributor and the entire expression can be accurately reduced to:

$$P_{NDWE} \text{ } (x=2, k=32) \text{ [}R_2 \text{ code]} \leq P_8(1.35 \times 10^{-12}) \quad (23)$$

where $P_8$ is the probability of getting exactly 8 noise hits in a word time. It should be stressed that the P terms in all the above general equations are merely the probability of the noisy channel's producing exactly n noise hits during a word time, and are valid for *any* noisy-channel model whether it be Poisson-distributed or not. The only assumption made is that the noise be random 1's and 0's superimposed into the received encoded bit stream. The reason for the "$\leq$" in these equations is, as has been explained, due to the fact that any contiguous strings of 1's (or 0's), i.e. "smeared" bits, are guaranteed detectable and would always give a $P_{NDWE}=0$ for any Riddle code.

Therefore the calculations are worst-case in that they assume no bit smearing. Because contiguous strings can often result from noise bursts, these would only further *reduce* the $P_{NDWE}$. It wil be intuitively obvious that this coding technique is effective even against purely random noise or noise bursts, which could occur if the signal-to-noise ratio of the channel were to approach Shannon's Limit, or if the channel became assymetric and randomly produced more 1's than 0's, or vice versa (i.e. any deviation from the equiprobable 1-0 noise of the Binary Symmetric Channel only further reduces the probability of non-detectable errors). A computer simulation performed on an $R_1$ code (which verified the above $P_{NDWE}$ calculations) used a channel with a 50% bit-hit-rate (i.e. a Poisson-distribution with a vT of 8 for 16-bit (encoded) words, a situation most likely to produce 4 random errors per word). Of the 2 million simulated transmissions performed, only about 6000 were received in error; about 30,000 were detected as parity-errors, slightly over 1½ million received multiple-erasures, 350,000 had single erasures, and about 60,000 were received correctly . . . certainly respectable performance for a 50% BHR (25% BER) channel transmitting data words of only 8 bits in length. Limited computer availabiity severely restricted the simulations to only a few channels with unrealistically high bit-error-rates in order that any word errors at all be generated. A computer-simulated run of another 2,000,000 "transmissions" of standard 8-bit ASCII $R_1$-encoded but with the BHR reduced to 1% (i.e. a Poisson vT of 0.16) resulted in 1,846,492 words being received correctly; 147,966 were decoded as "single erasures", 5,116 as "multiple erasures", and 426 were detected as having failed parity, for a total of 2,000,000. The number of word errors was zero. This is readily explainable (and thus anticipated) since the calculated $P_{NDWE}$ for the $P_4$ through $P_8$ terms$=2.42\times10^{-8}$, equivalent to an error once in every 41 million words (at this high a BER, the $P_4$ term alone contributes only 92% of the total $P_{NDWE}$, hence several of the higher-order terms were included for the sake of precision). Thus any-order Riddle Code by itself is a single-erasure correcting and/or detecting, multiple-erasure detecting, error-erasure-transformation geometrically-constrained code, which is guaranteed to detect any number of contiguous 1's (or 0's) inserted into the encoded stream, from a "string" of length 1 (i.e. a single error) to infinity (channel interruption). The most popular single-error-correcting, double-error-detecting code is the Hamming Code, a minimum-distance=3 code (see ITT Corp. paper by E. L. Wall, "Applying the Hamming Code . . . ," Electronics, Nov. 22, 1979 pgs. 103–110). As with all minimum-distance codes, such as Reed-Solomon/Golay/BCH, etc., the Hamming Code suffers from a catastrophic-decoding-failure mode whenever the number of errors per word equals or exceeds the code's "minimum distance", ($d_{min}/2$ for codes doing error correction only). If this occurs, the decoder cannot tell that $d_{min}$ or more errors have occurred; it will assume either that a different word was correctly sent, or it will incorrectly "correct" the incorrect word. It will then output this totally-erroneous word assuming that it is correct . . . hence the term "catastrophic error" (i.e. an "NDWE"; see the excellent treatise by Elwyn Berlekamp, "The Technology of Error-Correcting Codes", *Proceedings of the IEEE,* May 1980, pgs. 564 to 593). Some of the advantages of Riddle Coding over Hamming Coding can be demonstrated mathematically. The first-order Riddle Code ($R_1$) can possibly fail only for rare combinations of integer multiples of 4 errors; the Hamming Code fails catastrophically for 3,4,5,6,7,8 . . . errors. Given a certain noisy channel with a BHR probability $P_n$ of causing n random noise hits per word, the Hamming code will fail such that, using the previously defined notation:

$$P_{NDWE} \text{ (Hamming)} \geq P_{3/3} + P_{4/3} + P_{5/3} + P_{6/3} + \ldots \text{[the 3-error terms]} + \qquad (24)$$

$$P_{4/4} + P_{5/4} + P_{6/4} + P_{7/4} + \ldots \text{[the 4-error terms]} + P_{5/5} +$$

$$P_{6/5} + P_{7/5} + P_{8/5} + \ldots \text{[the 5-error terms]} +$$

$$\ldots \text{[infinite \# of higher-error terms]}$$

Factoring this into $P_n$ groups, this becomes:

$$P_{NDWE} \text{ (Hamming)} \geq P_{3/3} + [P_{4/3} + P_{4/4}] + [P_{5/3} + P_{5/4} + P_{5/5}] + \qquad (25)$$

$$[P_{6/3} + P_{6/4} + P_{6/5} + P_{6/6}] + \ldots \text{etc.}$$

Since it has been derived in equation 11 that for random hits, $P_{H/E} = (E)/2^H$, equation 25 can be expanded and simplified to:

$$P_{NDWE} \text{ (Hammering)} \geq P_3 \left[ \frac{\binom{3}{3}}{2^3} \right] + P_4 \left[ \frac{\binom{4}{3} + \binom{4}{4}}{2^4} \right] + \qquad (26)$$

$$P_5 \left[ \frac{\binom{5}{3} + \binom{5}{4} + \binom{5}{5}}{2^5} \right] +$$

$$P_6 \left[ \frac{\binom{6}{3} + \binom{6}{4} + \binom{6}{5} + \binom{6}{6}}{2^6} \right] + \ldots =$$

$$P_3 \left[ \frac{1}{8} \right] + P_4 \left[ \frac{4+1}{16} \right] + P_5 \left[ \frac{10+5+1}{32} \right] +$$

$$P_6 \left[ \frac{20+15+6+1}{64} \right] + \ldots$$

Thus the probability of catastrophic failure for a Hamming Code is $$P_{NDWE} \text{ (Hamming)} \geq \frac{P_3}{8} + \frac{P_4}{3.2} + \frac{P_5}{2} + \frac{P_6}{1.524} + \ldots \qquad (27)$$

Again, each $P_n$ term is the probability of each word's getting exactly n random noise hits. As is well known in the art, an 8-bit data-word Hamming-encoded has 4 "Hamming bits" added to it in order to do single-error-correction (SEC). To also do double-error-detection (DED), mandatory in systems where more than 1 error is not improbable, another overall Hamming parity bit must be added (triple-error-detection is of course impossible in a minimum-distance-3 code). Thus an 8-bit word Hamming-encoded for SEC and DED would be $8+4+1=13$ bits long. The 8-bit word Riddle-encoded would of course be 16 bits long (also including a parity bit). Assuming for comparison purposes a very-poor channel with a 0.1% BER, with random 1-0 noise Poisson-distributed, the corresponding vT figure for the $R_1$-encoded words will be 0.032 (i.e. a 0.1% BER = a 0.2% BHR, which with 16-bit words implies 1 hit/each 31.25 words), and the equivalent Hamming vT will be smaller, namely 0.026 (a 0.2% BHR with 13-bit words = 1 hit/38.46 words due to the slightly shorter word length). Knowing the vT figures, the Poisson-probabilities of getting precisely n hits/word can be calculated from Equation 1. The $P_3 \rightarrow P_6$ probabilities for the 2 vT's are listed below:

|  | RIDDLE | HAMMING |  |
| --- | --- | --- | --- |
| $P_3 =$ | $5.29 \times 10^{-6}$ | $2.85 \times 10^{-6}$ | (28) |
| $P_4 =$ | $4.23 \times 10^{-8}$ | $1.86 \times 10^{-8}$ |  |
| $P_5 =$ | $2.71 \times 10^{-10}$ | $9.65 \times 10^{-11}$ |  |
| $P_6 =$ | $1.44 \times 10^{-12}$ | $4.18 \times 10^{-13}$ |  |

Since the $P_{NDWE}$ for the Hamming Code equals $$\frac{P_3}{8} + \frac{P_4}{3.2}$$

+etc. (equation 27):

$$P_{NDWE} \text{ (Hamming)} \geq 3.56 \times 10^{-7} + 5.81 \times 10^{-9} + \ldots = 3.62 \times 10^{-7} \qquad (29)$$

The corresponding Riddle-code error probability, again for 8-bit words and a 0.1% BER (0.2% BHR):

$$P_{NDWE} \text{ (Riddle)} \leq \frac{P_4}{1040} = \frac{4.23 \times 10^{-8}}{1040} = 4.067 \times 10^{-11}$$

(see eqn. 17)

Therefore, $$P_{NDWE} \text{ (Riddle)} \leq P_{NDWE} \text{ (Hamming)} \times 1.14 \times 10^{-4} \qquad (30)$$

This improvement of nearly 4 orders of magnitude, even for such a poor channel, is a minimum improvement, as noted, as it assumes that no non-detectable errors occur in the Hamming decoder due to word-misframing, that no bit smearing or strings occur (since these cause the Riddle $P_{NDWE}$ to equal zero, whereas Hamming has no immunity to them), and that the channel is binary-symmetric (since any deviation from equiprobable 1's and 0's will only decrease the Riddle $P_{NDWE}$ while having no advantageous effect on the Hamming decoder). The Riddle code, however, is *not* performing single-error-correction (actually single-*erasure*-correction, which we shall call "SERC"), it is solely performing single and multiple error-and-erasure detection. Naturally if we allow the Riddle decoder to do SERC, this high improvement factor must of course be reduced considerably, since it is now possible for the Riddle-decoder to fail on some *triple* errors, which brings it down nearer the Hamming code's 3-error failure mode. The $R_1$ decoder could fail at SERC *if* a double-adjacent error totally inverted a data-dibit in the same word where a 3rd error has caused a single erasure. In this unusual case, parity will miscorrect the erasure. However, 3 errors can be arranged into a 16-bit word in $\binom{16}{3}=560$ ways. Of these 560 combinations, there are $14\times 8=112$ possible arrangements of 2-errors-in-a-data-dibit plus 1 separate error (erasure). Assuming again worst-case random noise, only 1 in 8 random 3-bit patterns will be the fatal set for any one word; and $R_1$ code performing SERC could fail at $P_3\times 112/560\times \frac{1}{8}=P_3/40$, versus $P_3/8$ for the Hamming code's first term. Thus even considering the $R_1$-code's slightly longer words, the first-order Riddle Code performing SERC is still several times more reliable than the equivalent Hamming Code doing SEC. Also, any increase in the word length of the Riddle-code would just further reduce the $P_{NDWE}$. Thus not only is the Riddle Code still more reliable, it must be noted that SERC is much more valuable than SEC, besides being easier and faster to perform. In a Riddle decoder, all errors which don't occur precisely as adjacent-bit-pair-inversion-errors in a data-dibit (or quad, etc.) can be decoded as *erasures*, not errors, merely by using Ex-Or's Decoder 30 with individually-examinable outputs (any Ex-Or with a 0 output would contain, at that location, an erasure). Whereas a "standard" decoder would output only 1's and 0's, and if an error were detected would attempt to *find* it (and invert it), a Riddle decoder essentially outputs 1's, 0's, and ?'s. Since any single or separated errors and half of all adjacent-error pairs are guaranteed to be decoded as erasures ("?'s") this error-to-erasure transformation has far-reaching theoretical and practical implications. Because an erasure's *location* is known but it's value as a 1 or 0 isn't, erasures are theoretically at least twice as easy to correct as errors, which must first be detected and then located (often with complicated syndrome calculations, like Hamming, and often at considerable expense both in hardward and time). The advantage of having erasures instead of errors becomes more apparent when its realized that *half* of all erasures could always be accurately corrected merely by *quessing* whether each was a 1 or a 0, a simple method which is in fact employed by some high-speed correction algorithms used with minimum-distance codes. The transformation of errors into erasures, which Riddle Coding provides, has profound implications with regard to the field of Information Theory. Fundamental coding theory dictates that any code with minimum (Hamming) distance "d" between codewords is limited to correcting no more than $$\frac{d-1}{2}$$

errors (or $$\frac{d-2}{2}$$

if d is even), and can detect at most d-1 errors. As discussed previously, if the number of errors exceeds d-1, the decoder fails catastrophically. One of the fundamental tenets of coding theory is the equivalency of 1 error to exactly 2 erasures. Therefore, if *only* erasures were present, any code capable of detecting $$\frac{d-1}{2}$$

errors could detect and correct *twice* as many, namely d-1, erasures. Thus Riddle coding, which effectively transforms most errors into erasures, could nearly *double* the error-correcting capability of another code (see *Error-Correcting Codes,* Peterson and Weldon, 2nd Edition, MIT Press, Cambridge, MA 1978, pages 8,9 (Binary-Erasure Channel); page 121 (Optimum Codes for the Binary Symmetric Channel); page 124 (Table of Largest Known Values of k for Given Values of n and d); page 305 (Correction of Erasures and Errors). Combination of Riddle Coding with sophisticated error-correcting codes (such as Reed-Solomon codes) will create new codes with virtually unlimited error-detection abilities, and with increased error-correction capabilities, and all at *no increase* in code redundancy or bandwidth in systems which are and/or will be using the Bi-Phase method which is becoming the world standard for information modulation, as previously discussed. For example, magnetic storage media or communication links which are presently using the Hamming code (Hamming and Manchester encoders/decoders are available as single integrated-circuits), and which are using Bi-Phase (Manchester) modulation to record or transmit the data, are presently susceptible to the 3-error-catastrophism inherent to the Hamming Code. If these systems Riddle-decoded the Bi-Phase-modulated Hamming-coded information presently being transmitted or stored on magnetic disks, tape, solid-state memories, etc., an incredible increase in data reliability could be realized at virtually no cost. Using the previous example of a very-poor (0.1% BER) channel, knowledge that the Bi-Phase data can be intelligently decoded results in the realization that each 8-bit data word, encoded as 13-bits with the SEC/DED Hamming Code, exists as 26 bits of information on the magnetic medium and in the Riddle decoder. The 3-error-failure for the Hamming Code now requires a minimum of 6 errors, not 3. Six errors can be arranged into a 26-bit word in $\binom{26}{6}$ ways=230,230 ways, of which only 1 set in $2^6$ random sets will be the correct set for failure. The $P_{NDWE}$ for this decoding is:

$$P_{NDWE} \text{ [8-bit data-words with parity, Hamming-encoded for SEC/DED, Bi-Phase modulated for storage or transmission, and Riddle-decoded]} \leq P_{n=6}\frac{\binom{13}{3}}{\binom{26}{6}2^6} = \quad (31)$$

$$P_6 \left[ \frac{\frac{13!}{3! \, 10!}}{\frac{26!}{6! \, 20!}} (2^6) \right]$$

$$= P_6 \left( \frac{286}{230,230} \right) \left( \frac{1}{64} \right) =$$

$$\frac{P_6}{51,520} = P_6 \times 1.94 \times 10^{-5}$$

The fundamental failure mode for the standard (non-Riddle-decoded) Hamming code was shown to be $P_3/8$ in equation 27. By Riddle-decoding the Bi-Phase-modulated Hamming words, the relative improvement is:

$$\frac{\frac{P_3}{8}}{\frac{P_6}{51,520}} = \frac{P_3}{P_6} \times 6440 \quad (32)$$

This is 3.8 orders of magnitude *plus* the probability difference between P$_3$ and P$_6$. If the noise were Poisson-distributed with a terrible channel BER of 1% (i.e. a BHR of 2%), just for comparison purpose, the 1 hit per 50 bits would yield a vT of 0.5, i.e. one hit for each 2 words. This virtually-unusable channel would only have about 3 orders-of-magnitude difference between P$_3$ and P$_6$. Thus the P$_{NDWE}$ would be improved (Riddle-decoding the information) by about 7 orders-of-magnitude, worse case. If the BER were 0.1% instead of 1%, the improvement would be about 10 orders-of-magnitude. Thus the probability of catastrophic-decoding-failure has for all practical purposes *eliminated*. The error-correction capability of the "inner" Hamming Code has also been *doubled*. Any 2-adjacent (data-dibit) errors will both be corrected (since they will appear to be 1 error to the Hamming decoder), and any other double errors can also be corrected, since they will be transformed by the Riddle decoder into 2 erasures, and a code which can correct 1 error can correct 2 erasures. Obviously, the error detection capabilities of the Hamming code have been improved by so many orders of magnitude that the code now is essentially failure-proof.

The above Hamming code is a (13,8,3) code, using the standard "(n,k,d)" code-definition method where n=total #bits/word, k=# information bits/word, and d is the distance between codewords. Combining the (13,8,3) code with a first-order Riddle code produces a (26,8,6 ?) code. The 6 is unclear, since the code is no longer a "distance-6" code in standard coding terminology.

As has been demonstrated, the new (26,8) code can fail only for 1 in every 51,520 random sets of 6 noise hits, hence it would be misleading to call it a (26,8,6) code. This invites a reappraisal of coding terminology in order that the Riddle Codes, and codes with which they are combined, can be accurately identified and defined. As has been shown, the geometric-constraints inherent to a Riddle Code force the code to have a new form of "minimum distance" (the "n" in the P$_n$ term of lowest order) which has a *very low probability of occurring*. Anyone selecting or investigating a stand-alone or interleaved Riddle Code would be most interested in:

(a) the smallest # of errors which can fail the code(s)
(b) the probability of the code's failing if exactly this number of "minimum-required" random noise hits occurs in a word (i.e. what are the probabilistic and positional-constraint advantages?) independent of the actual probability of getting this # of hits Previously it was derived that an R$_1$-encoded 8-bit word with parity (length "n"=16 bits) could only first fail with 4 errors, but that only 1 in every 1040 $(1/1040 = 9.62 \times 10^{-4})$ random 4-bit sets would on the average cause a catastrophic NDWE. Obviously this code is orders of magnitude more powerful than any (16,8,4) code. One possible new nomenclature would be to reference it as an (R$_1$, 16,8,4 [$9.6 \times 10^{-4}$]) code, i.e. (R$_x$,n,k,d[Pd,f]), where Pd,f is the probability that exactly d random noise hits will cause code failure. This immediately informs one that it's a first-order Riddle code with 16-bit-long words, 8-information-bits per word including parity, a minimum distance of 4 but which will fail only on 1 in every 1040 random 4-hit sets. The R$_2$ code for 8-bit words examined previously was shown to fail for only 1 in every 96 million random 8-hit sets. Such a code could be denoted as an (R$_2$, 32,8,8[$1.04 \times 10^{-8}$]) code. This would mean that an 8-bit word has been R$_2$-encoded into a 32-bit word (i.e. a rate-one-quarter code), that 8 errors could fail the code, but that geometric constraints result in only 1 of every 96.2 million sets of exactly 8 hits causing a NDWE (assuming random 1-0 noise hits). The (13,8,3) Hamming code which was R$_1$-coded could therefore be designated as a concatenated (R$_1$,26,8,6[$1.94 \times 10^{-5}$],H) code, i.e. a first-order Riddle outer code or decoder combined with a Hamming inner code, each encoded 8-bit data-word being 26 bits long, with code failure occurring for 1 in every 51,520 random 6-hit sets. The powerful burst-error-correcting minimum-distance-9 Reed-Solomon (15,7,9) code, which can correct any combination of 4 or fewer errors (but fails catastrophically for 5 or more), could be concatenated with an outer R$_1$ code. The new resulting code could be designated an (R$_1$, 30,7,10[$9.7 \times 10^{-8}$]RS) code. Because the inner RS(15,7,9) code could fail for 5 *or more* errors, and because the R$_1$-concatenated code can fail only for rare combinations of at least 10 errors, the combinatorial geometrics and probilities reduce the P$_{10}$ term by:

$$\frac{\binom{15}{5}}{\binom{30}{10}} \cdot \frac{1}{2^{10}} = \frac{3003}{3.077 \times 10^{10}} = \quad (33)$$

$$\frac{1}{1.0245 \times 10^7} = 9.761 \times 10^{-8}$$

Thus the new Riddle/Reed-Solomon code essentially *cannot fail catastrophically*. Not only would at least 10 errors have to occur in the 30-bit word of this example, only one in over 10 million random 10-hit sets could cause code failure. The same RS code alone, not Riddle-coded, would fail catastrophically for nearly 25% of all random 10-hit sets (P10/5=0.246) and 9-hit sets (P9/5=0.246); also 22% of all 8-hit sets (P8/5=0.219), 16.4% of all 7-hit sets (P7/5=0.246), 9.4% of all 6-hit sets (P6/5=0.094), and 3.1% of all 5-hit sets (P5/5=1/32). Not only has the number of errors required for failure been *doubled* and *quantized*, the correction capability of the code has also been increased, since twice as many erasures as errors can be corrected. Even for the worst-case improbable situation of a momentary totally-random noise burst *occurring at the received bit rate,* the number of erasures will average at least *twice* the number of errors. This is readily apparent when one considers that inserting either 00, 01, 10 or 11 into any data-dibit will result in an average of 2 erasures, 1 error (the double inversion), and one "no change". Any Reed-Solomon code that can correct 4 errors can correct 2 (decoded) errors and 4 (decoded) erasures (or 1 error and 6 erasures, etc.). Since 2 decoded errors could only result from 4 errors in 2 datadibits of the Riddle code, and since 4 erasures can result only from 4 single-errors in 4 dibits, correcting "2 errors plus 4 erasures" is therefore equivalent to correcting 8 errors in the received encoded bit-stream. Obviously, the error-detection properties of the code have been improved so many orders of magnitude that the code can now be considered failure-proof. As previously explained, all these improvements could presently be realized for "free" in systems currently using the Bi-Phase modulation technique, as the doubling due to the rate-one-half $R_1$ code has already been done in the Bi-Phase process, hence no additional redundancy or bandwidth would be required. All that need be added is a Riddle decoder.

The clever possibilities of concatenation of Riddle Codes with other codes are of course nearly endless. Combination of a Riddle Code with the new "orchard" code (see "Three Ways of Correcting Erroneous Data", *Electronics,* May 5, 1981, "One Check Bit Per Word Can Correct Multibit Errors", by E. Scott and D. Goetschel) will provide a powerful new code capable of completely (and correctly) *replacing* words that have been *totally obliterated* during transmission. This is because only a *single* orchard-bit is needed to replace any single erasure, whereas 2 orchard-bits are required to *find* and *invert* any single error. This process of using orchard coding to re-insert *erasures* has been totally unforseen by the authors of the article, which is not surprising as virtually all codes are aimed at detecting (and locating if possible) errors. A digital coding technique which converts errors-to-erasures could therefore be used in a unique and novel way with "orchard" coding to provide new, useful, and non-obvious advantages. Any orchard-bit (vector) which contained a single erasure could correctly replace the missing bit *without* requiring a 2nd orchard-bit to do error location by vector-intersection.

What is claimed is:

1. A method for decoding an encoded signal that includes a series of encoded digital data messages, each message encoded in such a way that each bit thereof is contained in the ordering of a complementary bit pair, each encoded message being separated by a plurality of non-complementary bits, the method comprising:
analyzing simultaneously a plurality of adjacent bit pairs of the encoded signal and producing an output when there are identified (i) a string of complementary bit pairs having a length in pairs equal to the number of bits in one of the messages and (ii) a plurality of non-complementary bits in at least one of the positions immediately preceding or immediately following the string.

2. A method according to claim 1, wherein each message is of uniform bit length L, further including the step of analyzing simultaneously at least L+1 adjacent bit pairs.

3. A method according to claim 2, further including the step of analyzing simultaneously at least L+2 adjacent bit pairs.

4. A method according to claim 3, wherein each encoded message is separated by at least three non-complementary leading bits and at least three non-complementary trailing bits, further including the step of analyzing simultaneously for complementarity L adjacent bit pairs and for non-complementarity at least three adjacent bits before, and at least three adjacent bits after, the L adjacent bit pairs.

5. A method according to claim 2, permitting the correction of a single erasure in a message of the encoded signal, each message including a parity bit indicative of the number of 1s therein, the method further comprising:
producing an output when there are identified at least L-1 complementary bit pairs in a string of L bit pairs;
determining the position, if any, in the string where a non-complementary bit pair and hence an erasure is present; and
determining, if an erasure is present, what value for the erasure is necessary in order to preserve the parity indicated by the parity bit.

6. A method, according to claim 1, for encoding and decoding a series of digital data messages of one or more known bit lengths, the method comprising:
A. transforming each bit of each digital data message into a corresponding pair of complementary bits wherein the original 1 or 0 information of each message bit is contained in the ordering of the 1 and 0 in the pair of complementary bits so as to form an encoded message;
B. including between each encoded message a plurality of non-complementary bits so as to form an encoded signal;
C. transferring the encoded signal to a decoder; and
D. decoding the encoded signal in accordance with the method of claim 1.

7. A method according to claim 6, wherein each message is of uniform bit length L and step D includes the step of analyzing simultaneously at least L+1 adjacent bit pairs.

8. A method according to claim 7, wherein step D includes the step of analyzing simultaneously at least L+2 adjacent bit pairs.

9. A system for decoding an encoded signal that includes a series of encoded digital data messages, each message encoded in such a way that each bit thereof is contained in the ordering of a complementary bit pair, each encoded message being separated by a plurality of non-complementary bits, the system comprising:
decoding means for analyzing simultaneously a plurality of adjacent bit pairs of the encoded signal and producing an output when there are identified (i) a string of complementary bit pairs having a length in pairs equal to the number of bits in one of the messages and (ii) a plurality of non-complementary bits in at least one of the positions immediately preceding or immediately following the string.

10. A system according to claim 9, wherein each message is of uniform bit length L and the decoding means includes means for analyzing simultaneously at least L+1 adjacent bit pairs.

11. A system according to claim 10, wherein the decoding means includes means for analyzing simultaneously at least L+2 adjacent bit pairs.

12. A system according to claim 9, wherein each encoded message is separated by at least three non-complementary leading bits and at least three non-complementary trailing bits, and the decoding means includes means for analyzing simultaneously for complementarity L adjacent bit pairs and for non-complementarity at least three adjacent bits before, and at least three adjacent bits after, the L adjacent bit pairs.

13. A system according to claim 10, permitting the correction of a single erasure in a message of the encoded signal, each message including a parity bit indicative of the number of 1s therein, wherein the decoding means includes means for producing an output when there are identified at least L−1 complementary bit pairs in a string of L bit pairs and the system further includes means for determining the position, if any, in the string where a non-complementary bit pair and hence an erasure is present; and means for determining, if an erasure is present, what value for the erasure is necessary in order to preserve the parity indicated by the parity bit.

14. A system according to claim 10, wherein the decoding means includes:

a shift register having a first input connected to the encoded signal, a number of stages not less than 2L+2, for holding in the aggregate not less than L+1 adjacent bit pairs of the encoded signal, and an output from each stage thereof; and logic means for determining whether at a given instant in time the outputs of L consecutive pairs of adjacent stages are complementary and the outputs of another pair of adjacent stages are non-complementary.

15. A system according to claim 14, wherein the logic means includes:

an array of L exclusive OR gates connected to the outputs of L consecutive pairs of adjacent stages of the shift register, each gate having as inputs the outputs of a pair of adjacent stages of the shift register;

at least one AND or NOR gate connected to the outputs of an adjacent pair of stages of the shift register, other than the L consecutive pairs of stages, in a relative position along the shift register corresponding to where a pair of non-complementary bits are anticipated to be all logical 1s (in the case of an AND gate) or all logical 0s (in the case of a NOR gate).

16. A system according to claim 15, wherein the logic means includes:

parity checking logic means, having inputs connected to the shift register outputs at those positions corresponding to the anticipated location of those bits in the shift register which correspond to the original uncoded digital data message, for providing an output of a logical 1 only when the predetermined odd or even parity bit input is proper when compared with the other inputs to the parity checking logic means;

clocking logic means, having inputs connected to outputs of the foregoing gates, for providing an output clocking signal only when all logic inputs thereto are a logical 1;

output latching register means having a clock input, connect of the clocking logic means, and L latching register stages with each stage connected to an output of the shift register at a position corresponding to the anticipated location of a bit in the shift register which corresponds to the original uncoded digital data message, wherein a signal on the clock input causes the input to each latching register stage to be transferred to and held at the output of each latching register stage, so that the outputs of the latching register stages comprise the original uncoded digital data message.

17. A system according to claim 16, further comprising:

means for detecting a single erasure, having with inputs connected to the outputs of the foregoing gates, and an output signal, for providing an output signal only when all inputs are logical 1s except for one input of a single EXCLUSIVE OR gate which is a logical 0, so that the output signal indicates that a single erasure is present in the shift register at that location corresponding to that single EXCLUSIVE OR gate which has a logical 0 output; and means for correcting a single erasure by calculating the value of an erased bit from the predetermined parity information and reinserting the correct bit at the known erasure location in the decoded data output.

* * * * *